(12) United States Patent
Son et al.

(10) Patent No.: US 12,031,365 B2
(45) Date of Patent: Jul. 9, 2024

(54) OPENING AND CLOSING STRUCTURE OF GLOVE BOX

(71) Applicants: KBI DONGKOOK IND. CO., LTD., Seoul (KR); HYUNDAI MOBIS CO., LTD., Seoul (KR)

(72) Inventors: Dong Il Son, Ulsan (KR); Dong Yong Choi, Gyeonggi-do (KR); O Sim Kwon, Ulsan (KR); Tae Yong Eom, Ulsan (KR); Sun Kyung Kim, Ulsan (KR); Chang Bok Park, Ulsan (KR); Jong Eun Park, Gyeonggi-do (KR)

(73) Assignees: KBI DONGKOOK IND. CO., LTD., Seoul (KR); HYUNDAI MOBIS CO., LTD., Seoul (KR)

( * ) Notice: Subject to any disclaimer, the term of this patent is extended or adjusted under 35 U.S.C. 154(b) by 242 days.

(21) Appl. No.: 17/506,671

(22) Filed: Oct. 21, 2021

(65) Prior Publication Data
US 2022/0154502 A1  May 19, 2022

(30) Foreign Application Priority Data
Nov. 18, 2020 (KR) .......... 10-2020-0154662

(51) Int. Cl.
| | |
|---|---|
| E05C 9/04 | (2006.01) |
| B60R 7/04 | (2006.01) |
| E05B 83/30 | (2014.01) |
| E05C 9/22 | (2006.01) |

(52) U.S. Cl.
CPC ............. *E05C 9/041* (2013.01); *B60R 7/04* (2013.01); *E05B 83/30* (2013.01); *E05C 9/22* (2013.01)

(58) Field of Classification Search
CPC ... E05C 9/041; E05C 9/22; B60R 7/04; E05B 83/30; Y10T 292/0834; Y10T 292/0837; Y10T 292/084; Y10T 292/0843; Y10T 292/1016; Y10T 292/1018; Y10S 292/38
See application file for complete search history.

(56) References Cited

U.S. PATENT DOCUMENTS

2005/0104380 A1* 5/2005 Cho .................. E05B 83/30
                                                        292/33
2021/0317690 A1* 10/2021 Nakasone ............... E05B 83/30

FOREIGN PATENT DOCUMENTS

| DE | 102009012710 A1 | 9/2010 |
|---|---|---|
| KR | 1020080000070 A | 1/2008 |
| KR | 1020100132228 A | 12/2010 |
| KR | 1020130032559 A | 4/2013 |

(Continued)

*Primary Examiner* — Christine M Mills
*Assistant Examiner* — Yahya Sidky
(74) *Attorney, Agent, or Firm* — HAUPTMAN HAM, LLP

(57) ABSTRACT

An opening and closing structure of a glove box is proposed. The opening and closing structure of a glove box includes a handle rotatably provided at a front panel, a rotation unit connected to a longitudinal first portion of the handle, a first locking rod connected to the rotation unit, a gear unit connected to a longitudinal first portion of the first locking rod, and a second locking rod of which a longitudinal first portion is connected to the gear unit, wherein the rotation unit is configured to transmit power generated by the handle to the first locking rod while being rotatably disposed on the longitudinal first portion of the handle and an upper portion of a longitudinal center portion of the first locking rod.

4 Claims, 6 Drawing Sheets

(56) References Cited

FOREIGN PATENT DOCUMENTS

| KR | 101458095 B1 | 11/2014 | | |
|---|---|---|---|---|
| KR | 101575043 B1 | 12/2015 | | |
| KR | 1020210065707 A | 6/2021 | | |
| WO | WO-2017195557 A1 * | 11/2017 | ............... | B60R 7/06 |

* cited by examiner

[FIG. 1]
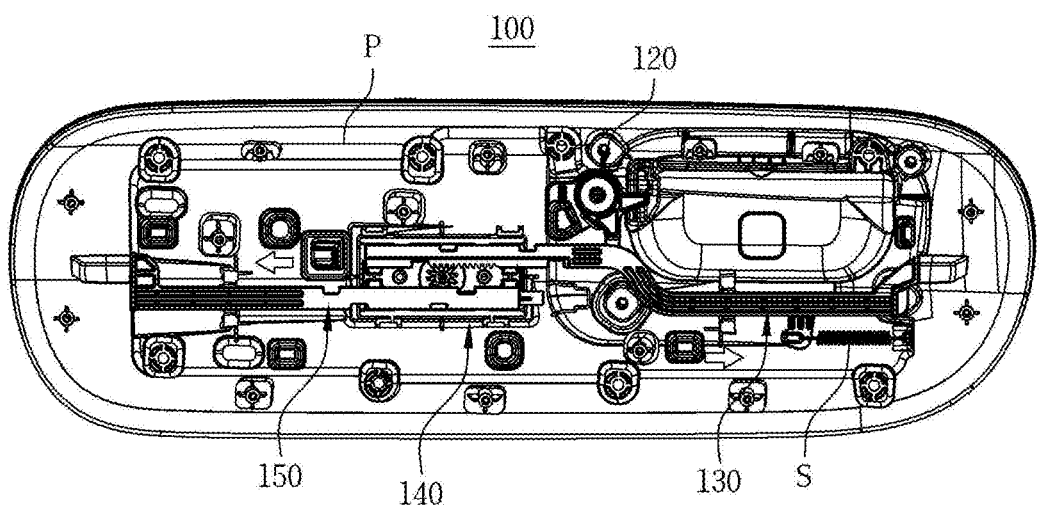

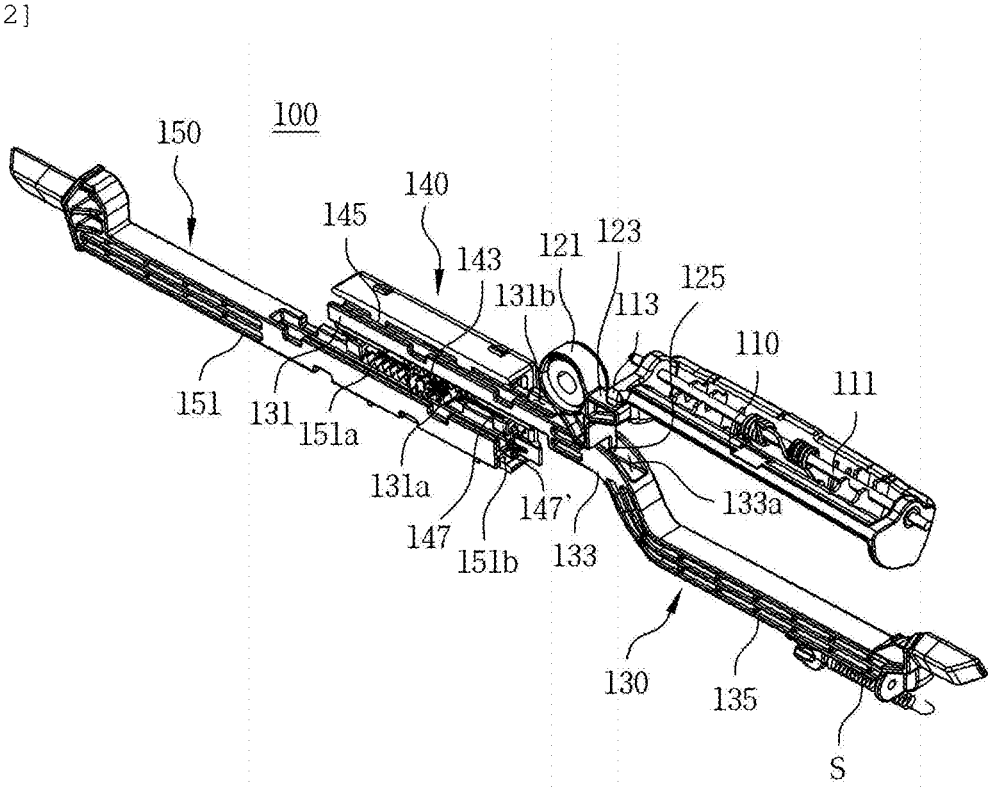
[FIG. 2]

[FIG. 3]
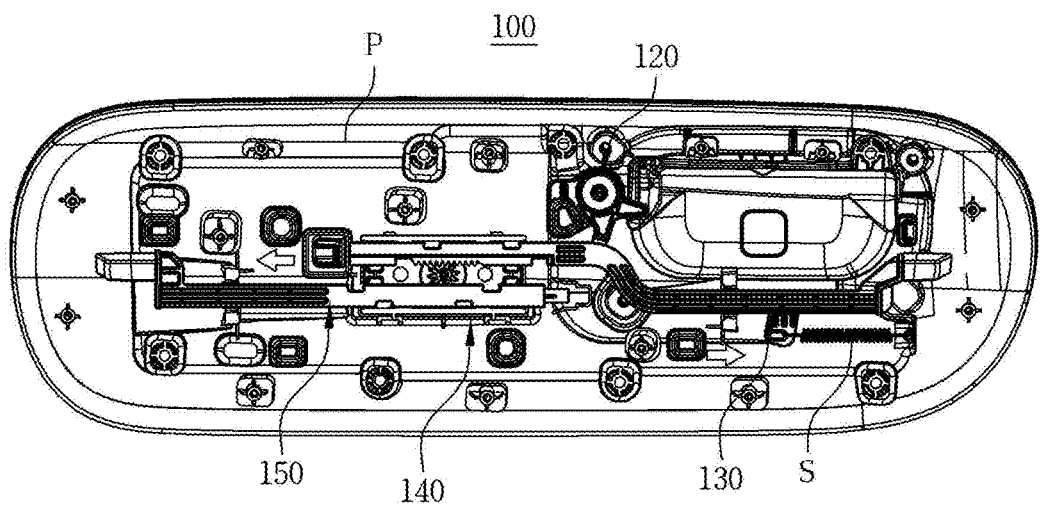

[FIG. 4]
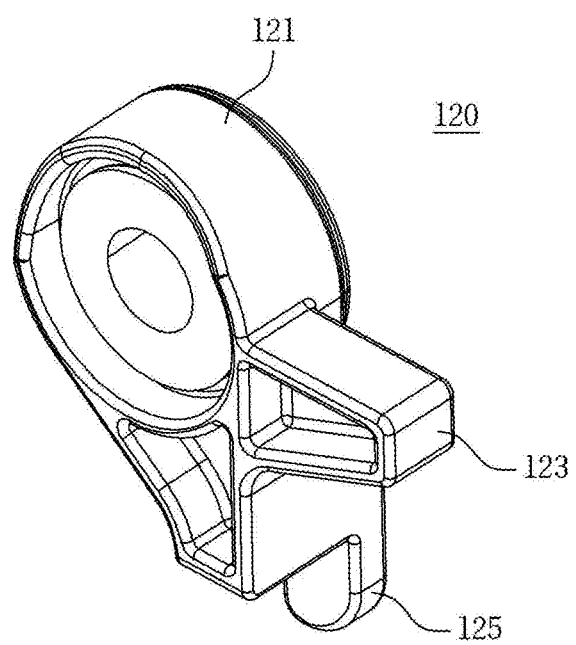

[FIG. 5]
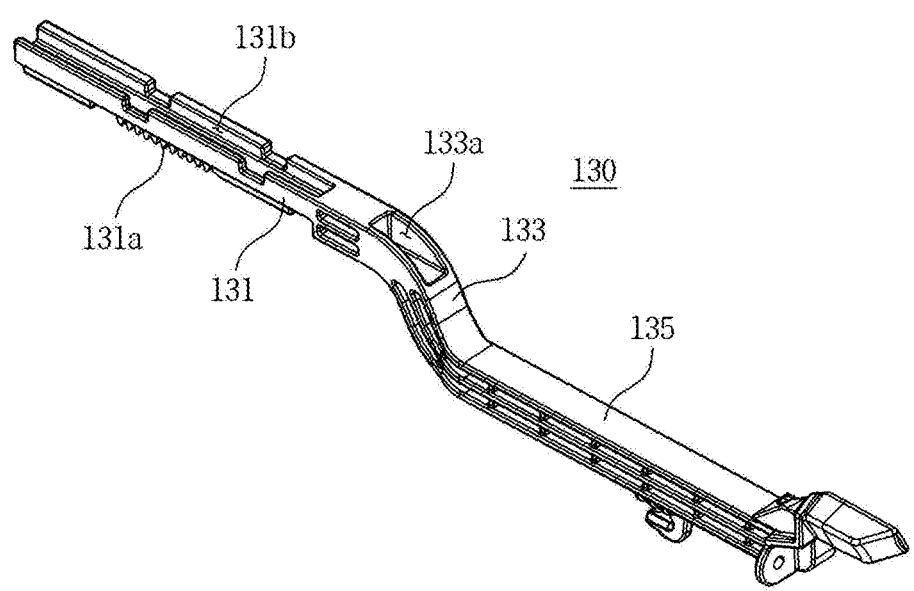

[FIG. 6]
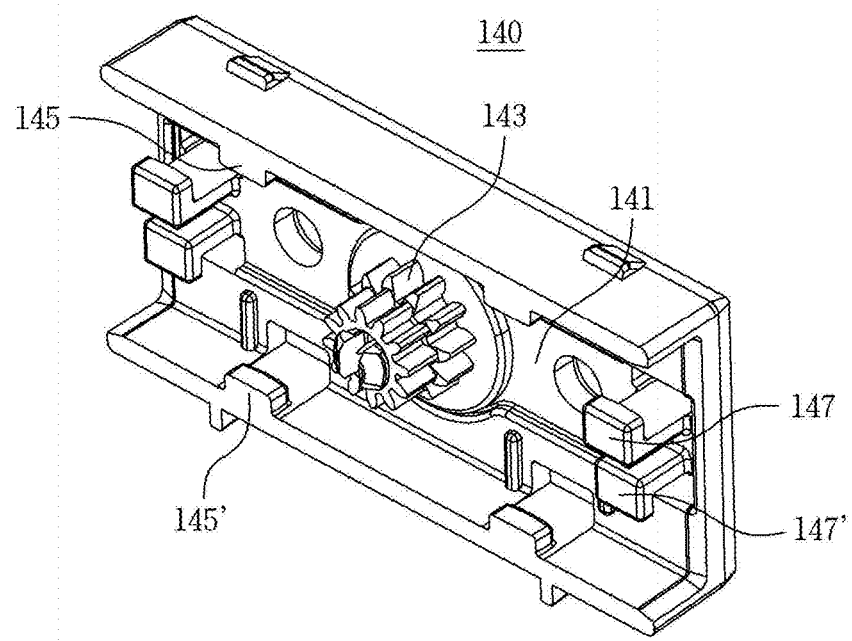

OPENING AND CLOSING STRUCTURE OF GLOVE BOX

CROSS REFERENCE TO RELATED APPLICATION

The present application claims priority to Korean Patent Application No. 10-2020-0154662, filed Nov. 18, 2020, the entire contents of which is incorporated herein for all purposes by this reference.

BACKGROUND OF THE INVENTION

Field of the Invention

The present disclosure relates to an opening and closing structure of a glove box and, more particularly, to an opening and closing structure of a glove box, the opening and closing structure being configured to allow a user to easily open and close a storage part of the glove box.

Description of the Related Art

In general, a dashboard in which an instrument device, an operation switch, an audio system, etc. are installed is provided in the front of the interior of a vehicle.

On one side of the dashboard, that is, on the passenger side of the dashboard, a glove box for storing small items used in the interior of the vehicle is installed so as to be able to be opened and closed.

The glove box may include a housing mounted to the dashboard, a storage part embedded in the housing, and a front panel mounted to a front surface of the storage part.

The storage part have an inside space for storing items, and may be opened and closed from the housing in a rotating method or sliding method.

The front panel is a component mounted on a groove formed in the front surface of the storage part, and has a handle gripped by a user On one surface of the front panel that faces the front surface of the storage part, a latch part is provided for converting the housing into an openable and closable state by the rotational operation of the handle, and the latch part include a pair of locking rods. An end of each locking rod passes through one of locking holes formed on opposite portions of the front surface of the storage part and then is fastened to one of other locking holes formed on opposite portions of the housing.

The convention glove box is configured such that, when the user pulls the handle provided on the front panel, the fastening end of the locking rod is separated from the locking hole formed on the housing. Then, as the storage part is rotatable or slidably movable on the dashboard, the inside space of the storage part is exposed to the user. Conversely, when the user pushes the front panel, the open housing may be moved toward the dashboard to return to its original state. The fastening end of the locking rod is inserted into the locking hole formed on the housing.

However, the conventional glove box is configured to have a moving distance of the locking rod shorter than a rotation distance of the handle. Therefore, there is a problem in that the user has to pull the handle excessively for opening the storage part.

In other words, the conventional the glove box may include a raising and lowering unit that is raised and lowered when the user rotates the handle for opening the storage part; and a pair of locking rods connected to the raising and lowering unit.

Each of the locking rods is configured such that one end thereof is in contact with an inclined rod provided in the raising and lowering unit. Therefore, when the raising and lowering unit 20 is raised, the locking rods may be moved in a direction in which the locking rods separate from the locking holes and are close to each other. When the raising and lowering unit is lowered, the locking rods may be moved in a direction in which the locking rods are away from each other and ends of the rocking rods may be mounted to the rocking holes.

With the above structure, structural stability can be secured while the locking rod is moved. However, the locking rod is configured to be moved leftward and rightward while being in contact with the inclined rod that is raised or lowered in a vertical direction, whereby there is a problem that the locking rod transmits a load to the user due to a friction force generated when the locking rod and the inclined rod are in contact with each other.

In other words, there is a problem in that the user has to open the storage part with a great force. Furthermore, the conventional glove box has a moving distance of the locking rod shorter than a maximum rotating movement of the handle, so there is a problem in that the user always has to open the storage part after pulling the handle to the maximum.

A raising or lowering distance of the raising and lowering unit should be increased for increasing the moving distance of the locking rod. However, for increasing the raising or lowering distance of the raising and lowering unit, the total size of each of the raising and lowering unit and the handle has to be increased, so there is a problem in that the volume of the glove box is increased.

Therefore, the present applicant has proposed the present disclosure in order to solve the above problems, and as a document of the related art, Korean Patent No. 10-1393568 'Glove box for vehicle' was published.

SUMMARY OF THE INVENTION

Accordingly, the present disclosure has been made keeping in mind the above problems occurring in the related art, and an objective of the present disclosure is to provide an opening and closing structure of a glove box, the opening and closing structure being configured to reciprocate a locking rod by rotation of a handle.

Another objective of the present disclosure is intended to provide an opening and closing structure of a glove box, the opening and closing structure being configured such that a user can easily open a storage part by simply pulling a handle.

In order to achieve the above objective, according to one aspect of the present disclosure, there is provided an opening and closing structure of a glove box, the opening and closing structure including: a handle rotatably provided at a front panel; a rotation unit connected to a longitudinal first portion of the handle; a first locking rod connected to the rotation unit; a gear unit connected to a longitudinal first portion of the first locking rod; and a second locking rod of which a longitudinal first portion may be connected to the gear unit, wherein the rotation unit may be configured to transmit power generated by the handle to the first locking rod while being rotatably disposed on the longitudinal first portion of the handle and an upper portion of a longitudinal center portion of the first locking rod.

The rotation unit may include: a rotation member rotatably mounted to a fixing pin provided on the front panel; a first link provided at one lateral portion of the rotation member, and extended horizontally to be connected to the handle; and a second link provided at a lower portion of the rotation member, and extended vertically to be connected to the first locking rod, wherein the second link may be configured to be longer than the first link.

The gear unit may include: a main body provided on the front panel; a pinion rotatably provided at a center portion of the main body; and guide members provided on upper and lower portions of the main body, respectively, and configured to guide linear movement of the first locking rod and the second locking rod.

The first locking rod may include: a first horizontal member having, on a lower portion thereof, a rack engaged with the pinion of the gear unit, and guide grooves, on an upper portion thereof, into which the guide members disposed on the upper portion of the main body may be inserted; a bent member configured to be bent downward from a longitudinal second end of the first horizontal member, and having a groove portion into which an end of the second link may be inserted and locked; and a second horizontal member extended horizontally from a longitudinal second end of the bent member, and connected to an elastic member, and the second locking rod may include: a third horizontal member having, on an upper portion thereof, a rack engaged with the pinion of the gear unit, and guide grooves, on a lower portion thereof, into which the guide members disposed at the lower portion of the main body may be inserted.

The gear unit may further include stoppers, the stoppers being provided at longitudinal opposite portions of the main body, respectively, and being configured to be brought into contact with the rack provided in the first horizontal member or with the rack provided in the third horizontal member.

According to the present disclosure, the opening and closing structure of a glove box is configured to provide the structure operated such that the reciprocating motion of the locking rod is immediately performed by rotation of the handle when the user pulls the handle for opening the storage part. In addition, the opening and closing structure is configured to provide the linear moving distance of the locking rod longer than the rotation distance of the handle. Therefore, the user can easily open the storage part effortlessly.

Furthermore, the opening and closing structure of a glove box according to the present disclosure is configured to transmit a force generated when the user pulls the handle to the locking rod through the rotation unit without loss.

Therefore, the storage part can be easily opened even when the user does not pull the handle excessively. In addition, the front panel may not be manufactured larger than necessary, so that the manufacturing cost of the glove box can be reduced.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 1 is a rear view taken from the rear, showing a front panel of a glove box according to an embodiment of the present disclosure.

FIG. 2 is a perspective view showing the opening and closing structure of the glove box according to the embodiment of the present disclosure.

FIG. 3 is a view showing an operated state of a locking rod as a rotation unit according to the embodiment of the present disclosure is rotated.

FIG. 4 is a perspective view showing a structure of the rotation unit according to the embodiment of the present disclosure.

FIG. 5 is a perspective view showing a first locking rod according to the embodiment of the present disclosure.

FIG. 6 is a perspective view showing a gear unit according to the embodiment of the present disclosure.

DETAILED DESCRIPTION OF THE INVENTION

Features and advantages of the present disclosure and an achieving method therefor will be more clearly understood from the embodiments, as will be described in detail hereinafter, in conjunction with the accompanying drawings.

However, the present disclosure is not limited to the embodiments disclosed below, but may be implemented in various different forms. The embodiments are provided to make the present disclosure complete, and are provided to fully inform one of ordinary skill in the art to which the present disclosure belongs, and the scope of the present disclosure is defined by the accompanying claims.

Hereinbelow, an opening and closing structure of a glove box according to an embodiment of the present disclosure will be described in detail with reference to FIGS. 1 to 6. In the following description, when the functions of conventional elements and the detailed description of elements related with the present disclosure may make the gist of the present disclosure unclear, a detailed description of those elements will be omitted.

FIG. 1 is a rear view showing a front panel of a glove box according to an embodiment of the present disclosure. FIG. 2 is a perspective view showing the opening and closing structure of the glove box according to the embodiment of the present disclosure. FIG. 3 is a view showing an operated state of a locking rod as a rotation unit according to the embodiment of the present disclosure is rotated. FIG. 4 is a perspective view showing a structure of the rotation unit according to the embodiment of the present disclosure. FIG. 5 is a perspective view showing a first locking rod according to the embodiment of the present disclosure. FIG. 6 is a perspective view showing a gear unit according to the embodiment of the present disclosure.

As shown in FIGS. 1 to 6, the opening and closing structure 100 of a glove box according to the embodiment of the present disclosure includes: a handle 110 rotatably provided at a front panel 50; a rotation unit 120 connected to a longitudinal first portion of the handle 110; a first locking rod 130 connected to the rotation unit 120; a gear unit 140 connected to a longitudinal first portion of the first locking rod 130; and a second locking rod 150 of which a longitudinal first portion is connected to the gear unit 140.

The front panel 50 may be a component that is mounted to a front surface of a storage part (not shown) providing a storage space. A groove portion is provided on the front surface of the storage part, and the front panel 50 is a component inserted and mounted to the groove portion.

The handle 110 may be configured to be rotatable upward and downward on the front panel 50, and may include a shaft 111 having a spring. When a user pulls the handle 110 and releases the handle 110, the handle may be rotated into an initial state by the shaft 111 having the spring.

As shown in FIGS. 2 and 4, the rotation unit 120 includes: a rotation member 121 rotatably mounted to a fixing pin provided in the front panel 50; a first link 123 provided at one lateral portion of the rotation member 121 and extended horizontally to be connected to the handle 110; and a second link 125 provided a lower portion of the rotation member 121 and extended vertically to be connected to the first locking rod 130.

The rotation member 121 has a hole into which the fixing pin provided on the front panel 50 is inserted, and has a circular shape.

The first link 123 protrudes from one lateral portion of the rotation member 121 in a direction where the handle 110 is disposed. The first link 123 is a component that is pressurized by being in contact with a lower surface of a step portion provided at the longitudinal first portion of the handle 110.

The second link 125 protrudes from the lower portion of the rotation member 121 in a direction in which the first locking rod 130 is disposed, and is configured to be inserted into and locked by a groove formed on the first locking rod 130.

Therefore, when the user rotates the handle 110, the step portion pressurizes an upper surface of the first link 123 whereby the rotation member 121 may rotate clockwise in conjunction with the pressure. The second link 125 is rotated clockwise, thereby pressurizing the first locking rod 130.

Preferably, the second link 125 may be formed longer than the first link 123. It is because a force of the user passing through the handle 110 and the rotation unit 120 is efficiently transmitted to the first locking rod 130. However, when the first link 123 is longer than the second link 125, a rotation radius of the rotation member 121 is reduced, thereby decreasing a turning angle of the second link 125 is reduced, causing a problem that a moving distance of the first locking rod 130 is generated.

Therefore, in order to increase a rotation radius of the rotation member 121 and for the user to open the storage part with a small force, it is preferable that the second link 125 is connected to the first locking rod 130 while having the length that is formed longer than the length of the first link 123.

It is preferable that the rotation unit 120 configured as described above is rotatably disposed on the longitudinal first portion of the handle 110 and an upper portion of a longitudinal center portion of the first locking rod 130, as shown in FIGS. 1 and 2. Because the opening and closing structure 100 of a glove box according to the embodiment of the present disclosure is configured to transmit a force of the user by a contact pressurization method to move the locking rod 130, 150.

In order to immediately transmit a force of the user pulling the handle 110 to the first locking rod 130, it is effective that the rotation unit 120 is rotatably disposed on the longitudinal first portion of the handle 110 and the upper portion of the longitudinal center portion of the first locking rod 130.

For example, assuming the rotation unit 120 is disposed on an upper portion of the longitudinal first portion of the first locking rod 130, as a distance between the rotation unit 120 and the handle 110 is increased, the force of the user cannot be effectively transmitted to the rotation unit 120 through the handle 110. In addition, the length of the first link 123 constituting the rotation unit 120 is increased, so there is a problem that a moving distance of the first locking rod 130 is reduced.

Furthermore, assuming the rotation unit 120 is disposed on an upper portion of a longitudinal second portion of the first locking rod 130, the rotation radius of the rotation unit 120 is reduced and thus causing a problem that the force of the user moving the first locking rod 130 is increased.

From a point of view that the user moves the first locking rod 130 by rotating the handle effortlessly and a point of view that the force of the user is immediately transmitted to the first locking rod 130, it is preferable that the rotation unit 120 is rotatably disposed on the longitudinal first portion of the handle 110 and the upper portion of the longitudinal center portion of the first locking rod 130.

As shown in FIGS. 2 and 5, the first locking rod 130 includes: a first horizontal member 131 in which a rack 131a engaged with a pinion 143 (referring to FIG. 6) of the gear unit 140 is provided on a lower portion thereof, and guide grooves 131b into which guide members 145 (referring to FIG. 6) of the gear unit 140 are provided on an upper portion thereof; a bent member 133 provided to be bent downward from a longitudinal second end of the first horizontal member 131, and having a groove portion 133a into which an end of the second link 125 is inserted and locked; and a second horizontal member 135 extended horizontally from a longitudinal second end of the bent member 133 and connected to an elastic member S.

The first locking rod 130 configured as described above is a component directly receiving a rotation force generated by the rotation unit 120.

The first horizontal member 131 is a component connected to the gear unit 140, which will be described below. As described above, the rack 131a engaged with the pinion 143 of the gear unit 140 is formed on the lower portion of the first horizontal member 131, and the guide grooves 131b into which the guide members 145 of the gear unit 140 are inserted are formed on the upper portion of the first horizontal member 131.

Therefore, when the rotation unit 120 is rotated clockwise, the first horizontal member 131 may be linearly moved while rotating the pinion 14, as shown in FIG. 3. The first horizontal member 131 is prevented from being moved in a transversal direction thereof by the guide members 145 of the gear unit 140. In other words, the guide members 145 of the gear unit 140 serve as a guide the first horizontal member 131 to be linearly moved in a longitudinal direction of the first horizontal member 131.

As shown in FIGS. 2 and 5, the bent member 133 is formed in a shape that is bent to be inclined downward from the longitudinal second end of the first horizontal member 131.

The bent member 133 allows the first horizontal member 131 and the second horizontal member 135 to be disposed at the same level, so that a space required for the user to pull the handle 110 may be provided in the front panel 50. In other words, according to the embodiment of the present disclosure, the second horizontal member 135 is disposed below the handle 110. Therefore, the space into which the user puts a hand for pulling the handle 110 may be sufficiently provided in a portion between the handle 110 and the second horizontal member 135.

When the first horizontal member 131 and the second horizontal member 135 are disposed at the same horizontal line, the space into which the user puts the hand for pulling the handle 110 is reduced. However, when the handle 110 is located above the first horizontal member 131 for solving the problem, there are problems that the entire size of the front panel 50 is increased and the size of the rotation unit 120 is increased.

Therefore, in order to dispose the first horizontal member 131 and the second horizontal member 135 at different levels, it is preferable that the bent member 133 is formed on the portion between the first horizontal member 131 and the second horizontal member 135.

In addition, the groove portion 133a receiving a force generated by the second link 125 of the rotation unit 120 is provided on the bent member 133, so that the first horizontal member 131 may be immediately moved in a straight line.

The second horizontal member 135 may have a first end connected to the longitudinal second end of the bent member 133 and a second end connected to a locking hole (not shown).

In addition, a lower portion of the second horizontal member 135 may be connected to a longitudinal first end of the elastic member S such as a compression spring. For example, a longitudinal second end of the elastic member S may be connected to the front panel 50.

The elastic member S may stretch when the second link 125 of the rotation unit 120 is rotated to pressurize the first horizontal member 131, but the second link 125 of the rotation unit 120 may be recovered to an initial state thereof. Then, a second bent member 135 is pulled by the elastic member S, and in conjunction with the movement of the second bent member 135, the first horizontal member 131 and the bent member 133 may be recovered to initial states thereof.

As shown in FIGS. 2 and 6, the gear unit 14 may include: a main body 141 provided on the front panel 50; the pinion 143 rotatably provided at a center portion of the main body; and guide members 145 and 145' provided on upper and lower portions of the main body 141, respectively, and guiding linear movement of the first locking rod 130 and the second locking rod 150.

The main body 141 may be mounted to a rear surface of the front panel 50, and has a predetermined area on which the pinion 143, the guide members 145 and 145', and stoppers 147 and 147', which will be described below, may be provided.

The pinion 143 is rotatably provided on the center portion of the main body 141. As described above, the pinion 143 is engaged with the rack 131a provided on the first horizontal member 131 of the first locking rod 130. Then, the pinion 143 is engaged with a rack 151a provided on a third horizontal member 151 of the second locking rod 150, which will be described below. The first horizontal member 131 of the first locking rod 130 is moved in a straight line while being disposed at the upper portion of the pinion 143, and a third horizontal member 153 of the second locking rod 150 is disposed below the pinion 143 and moved in a straight line.

The guide members 145 and 145' may be respectively provided the upper and lower ends of the main body 141. The guide members 145 provided on the upper portion of the main body 141 are inserted into the guide grooves 131b formed on the first horizontal member 131 of the first locking rod 130. The guide members 145' provided at the lower end of the main body 141 may be inserted into a guide groove 151b formed on the third horizontal member 151 of the second locking rod 150. Therefore, the first locking rod 130 and the second locking rod 150 may be rectilinearly moved by the guide members 145 and 145' safely.

Meanwhile, the gear unit 140 includes the stoppers 147 and 147' that limit a moving distance of the first locking rod 130 or the second locking rod 150.

The stoppers 147 and 147' are respectively provided on longitudinal opposite portions of the main body 141 and may be brought into contact with the rack 131a provided on the first horizontal member 131 or the rack 151a provided on the third horizontal member 151. Among the stoppers 147 and 147' provided on the longitudinal opposite portions of the main body 141, the stoppers 147 disposed on an upper portion of the main body 141 are brought into contact with the rack 131a provided on the first horizontal member 131. The stoppers 147' disposed on a lower portion of the main body 141 are brought into contact with the rack 151a provided on the third horizontal member 151.

Therefore, the stoppers 147 and 147' configured as described above may prevent the first locking rod 130 and the second locking rod 150 from being moved by more than a preset distance.

As described above, the second locking rod 150 may include: the third horizontal member 151 in which the rack 151a engaged with the pinion 143 of the gear unit 140 is formed on an upper portion of the third horizontal member 151; and the guide groove 151b into which the guide members 145' disposed on the lower end of the main body 141 are inserted is provided on a lower portion of the third horizontal member 151.

The second locking rod 150 configured as described above may be moved in a direction opposite to a moving direction of the first locking rod 130. When the user pulls the handle 110 for opening the storage part, the rotation member 121 is rotated, and in conjunction with the rotation member 121, the second link 125 pressurizes the first locking rod 130. Then, the first locking rod 130 may be moved in a first direction as shown in FIG. 3. The pinion 143 is rotated by the movement of the first locking rod 130, and in conjunction with the pinion, the second locking rod 150 may be moved in a second direction.

The longitudinal second end of the first locking rod 130 is separated from the locking hole, a longitudinal second end of the second locking rod 150 may also be separated from another locking hole. When the front panel 50 is pulled in the above state, the glove box can be easily opened.

Although the detailed embodiment of the present disclosure has been described for illustrative purposes, those skilled in the art will appreciate that various modifications, additions, and substitutions are possible, without departing from the scope and spirit of the present disclosure.

Accordingly, the present disclosure is intended to cover not only the above-described embodiment, but also various alternatives, modifications, equivalents and other embodiments that may be included within the spirit and scope of the present disclosure as defined by the appended claims.

What is claimed is:

1. An opening and closing structure of a glove box, the opening and closing structure comprising:
   a handle rotatably provided at a front panel;
   a rotation unit connected to a longitudinal first portion of the handle;
   a first locking rod connected to the rotation unit;
   a gear unit connected to a longitudinal first portion of the first locking rod; and
   a second locking rod of which a longitudinal first portion is connected to the gear unit,
   wherein the rotation unit is configured to transmit power generated by the handle to the first locking rod while being rotatably disposed on the longitudinal first portion of the handle and an upper portion of a longitudinal center portion of the first locking rod, the rotation unit comprises:
- a rotation member rotatably mounted to a fixing pin provided on the front panel;
- a first link provided at one lateral portion of the rotation member and extended horizontally to be connected to the handle, and pressurized by being in contact with a lower surface of a step portion provided at the longitudinal first portion of the handle; and
- a second link provided at a lower portion of the rotation member and extended vertically to be inserted into and locked by a groove formed on the first locking rod, and the second link is configured to be longer than the first link and pressurizes the first locking rod by cam contact.

2. The opening and closing structure of claim 1, wherein the gear unit comprises:
- a main body provided on the front panel;
- a pinion rotatably provided at a center portion of the main body; and
- guide members provided on upper and lower portions of the main body, respectively, and configured to guide linear movement of the first locking rod and the second locking rod.

3. The opening and closing structure of claim 2, wherein the first locking rod comprises:
- a first horizontal member having, on a lower portion thereof, a rack engaged with the pinion of the gear unit, and guide grooves, on an upper portion thereof, into which the guide members disposed on the upper portion of the main body are inserted;
- a bent member configured to be bent downward from a longitudinal second end of the first horizontal member, and having a groove portion into which an end of the second link is inserted and locked; and
- a second horizontal member extended horizontally from a longitudinal second end of the bent member, and connected to an elastic member, and the second locking rod comprises:
- a third horizontal member having, on an upper portion thereof, a rack engaged with the pinion of the gear unit, and guide grooves, on a lower portion thereof, into which the guide members disposed at the lower portion of the main body are inserted.

4. The opening and closing structure of claim 3, wherein the gear unit further comprises stoppers, the stoppers being provided at longitudinal opposite portions of the main body, respectively, and being configured to be brought into contact with the rack provided in the first horizontal member or with the rack provided in the third horizontal member.

* * * * *